Oct. 29, 1968     S. S. FOUSE     3,408,454
BUS DUCT WITH POWER TAKE-OFF MEANS
Filed Nov. 16, 1966     2 Sheets-Sheet 1

Oct. 29, 1968   S. S. FOUSE   3,408,454
BUS DUCT WITH POWER TAKE-OFF MEANS
Filed Nov. 16, 1966   2 Sheets-Sheet 2

United States Patent Office 3,408,454
Patented Oct. 29, 1968

3,408,454
BUS DUCT WITH POWER TAKE-OFF MEANS
Samuel S. Fouse, Aliquippa, Pa., assignor to Westinghouse Electric Corporation, Pittsburgh, Pa., a corporation of Pennsylvania
Filed Nov. 16, 1966, Ser. No. 594,883
9 Claims. (Cl. 174—71)

ABSTRACT OF THE DISCLOSURE

Improved bus duct comprises connectable sections with means for tapping power off of the bus duct at the connection.

---

Bus duct is generally manufactured in unit sections, which sections are connected together at an installation to provide a run of duct. For increased utility, it is desirable to provide means for tapping power off of the bus duct at the connection of sections of duct.

Accordingly, an object of this invention is to provide improved bus duct comprising connectable sections with means for tapping power off of the bus duct at the connection.

Another object of this invention is to provide improved bus duct comprising sections connectable by means of a single bolt connector, and a power take-off device removably connectable to the bus duct by means of the single bolt connector.

A general object of this invention is to provide improved bus duct having increased utility.

These and other objects of this invention will become more apparent upon consideration of the following detailed description when taken in conjunction with the accompanying drawings.

Figure 1:
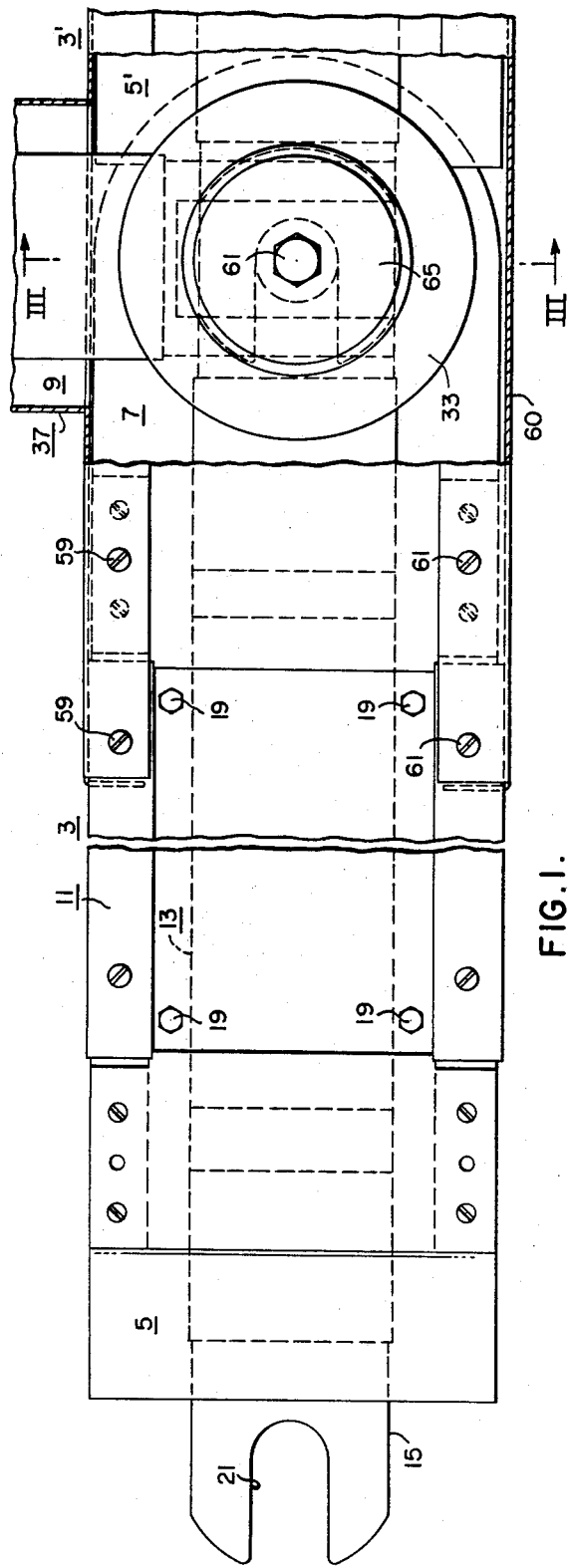
FIGURE 1 is a top plan view, with parts broken away, of bus duct constructed in accordance with principles of this invention.
Figure 2:
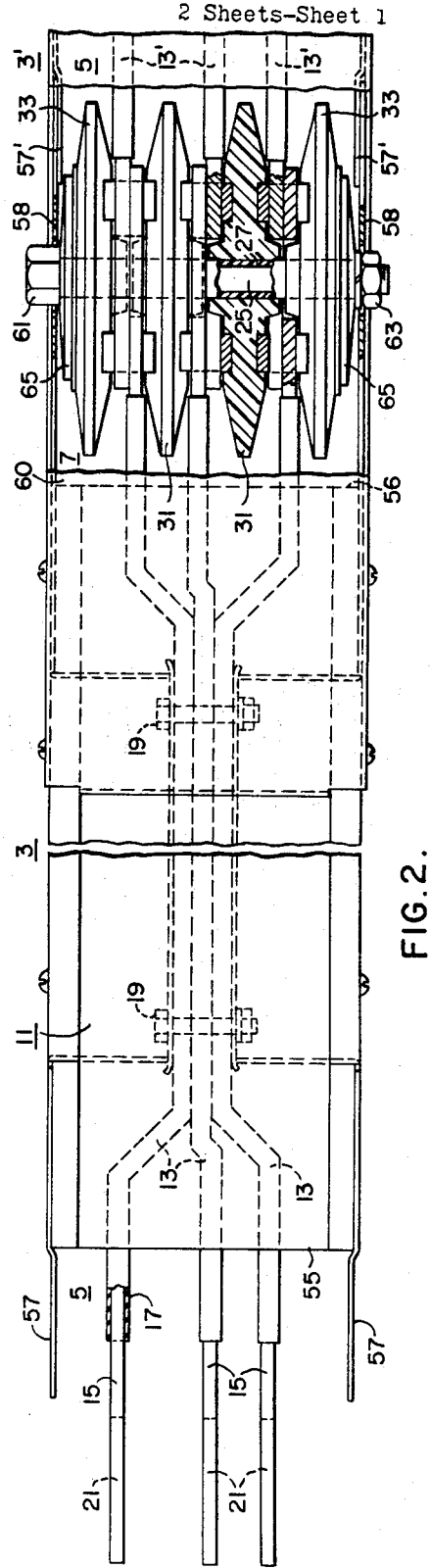
FIG. 2 is a side view, with parts broken away and with parts shown in section, of the bus duct illustrated in FIG. 1.

Referring to the drawings, there is shown, in FIGS. 1 and 2, an elongated section 3 of bus duct comprising a first connecting end part 5 at one end thereof and a second connecting end part 7 at the other end thereof. The connecting end part 7 of the section 3 is connected to the connecting end part 5' of a similar section 3'. A power take-off device 9 (FIGS. 1–3) is connected to the bus duct sections 3, 3' at the connection of the sections. The bus duct section 3 comprises a housing structure 11 and a set of three bus bar conductors 13 supported in the housing structure 11 in a generally parallel mutually flatwise face-to-face relationship. As can be seen in FIG. 2, the bus bars 13 are sandwiched together in a compact relationship at the main body part of the section, and they are offset at the opposite ends 5, 7 of the section to enable connection of the section to a similar section. The main body part of the section, including the housing and bus bars, is constructed in the manner disclosed in the copending patent application of Charles L. Weimer et al., Ser. No. 560,129, filed June 24, 1966, and assigned to the assignee of the instant case. Thus, only a brief description of the main body part of the bus duct section is given herein. The opposite ends 5 and 7, and also the connecting means for connecting the sections, differ in construction from that of the above-mentioned application of Charles L. Weimer et al. These different parts of the bus duct section will be specifically described.

Each of the bus bars 13 comprises a rigid conducting bar 15 and an insulating sleeve 17 supported on the conducting bar 15. Each insulating sleeve 17 terminates short of the opposite ends of the associated bus bar 15 to provide uninsulated end portions to permit connection of the bus bar to a bus bar of a similar section in an overlapping relationship. The bus bars 13 are supported, at the main body part of the section, by means of a plurality of bolts 19 that draw parts of the housing structure 11 inwardly toward each other to thereby draw the bus bars 13 into a compact relationship in the manner disclosed in the above-mentioned patent application of Charles L. Weimer et al.

Figure 4:
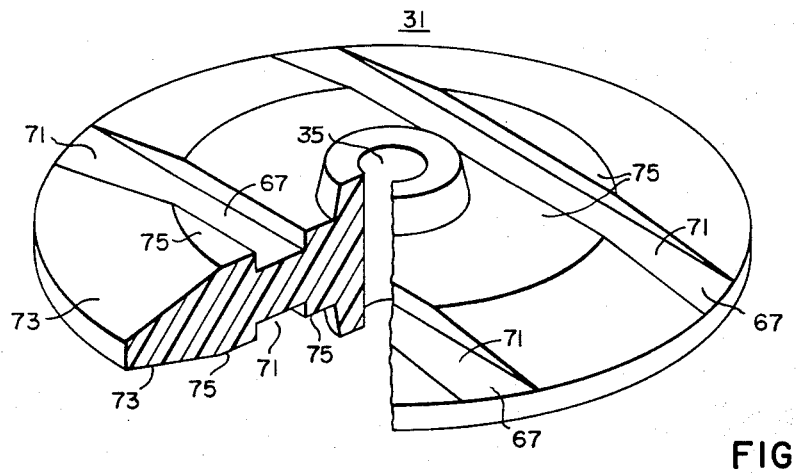
FIG. 4 is a perspective view, shown partly in section, of one of the insulating spacing means seen in FIGS. 1–3.

Each of the uninsulated bus bar portions 15, at the connecting-end part 5, has a slot 21 therein. Each of the uninsulated bar portions 15, at the connecting-end part 7, is provided with an opening therein for receiving a bolt 25, and an insulating tube 27 that is positioned over the bolt 25, which bolt 25 and insulating tube 27 are supported on the connecting-end part 7 of the bus duct section 3. Insulating means, comprising two inner insulating members 31 and two outer insulating members 33, are supported on the bus duct section 3 at the connecting end part 7 of the section 3 to space the bus bars at the connection and to provide insulation between the uninsulated connecting portions of the bus bars at the connection. Each of the insulating members 31, 33 is a rigid molded disk-shaped insulating member. Each of the insulating members 31, 33 is provided with an opening 35 (FIG. 4) through the center thereof for receiving the bolt 25 and insulating tube 27 (FIG. 2).

Figure 5:
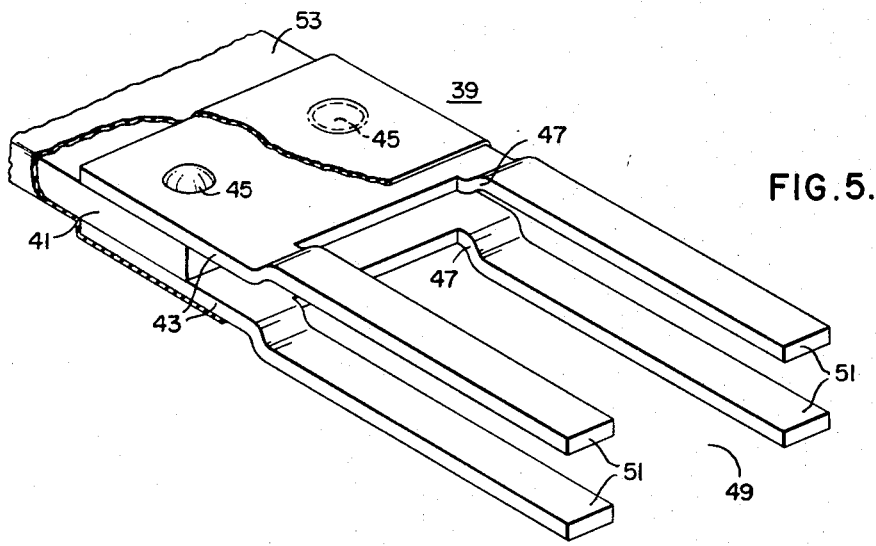
FIG. 5 is a perspective view, with parts broken away and with an insulating cover shown partly in section, of one of the take-off bus structures of the power take-off device of FIGS. 1–3.
Figure 3:
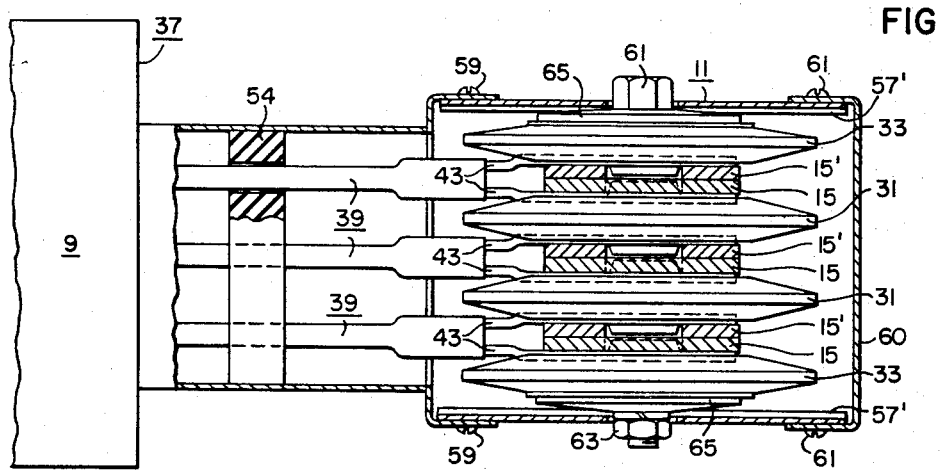
FIG. 3 is a sectional view taken generally along the line III—III of FIG. 1.

The power take-off device 9 is connected to the bus duct sections 3, 3' at the connection of the sections. The power take-off device 9 comprises a housing structure 37 and three power take-off bus bar conductor structures 39. Each of the take-off bus bar conductor structures 39 comprises a rigid conducting bar 41 (FIG. 5) and two conducting bars 43 secured to the bar 41 by means of rivets 45. The bars 43 are bent over at 47 to provide a spacing between the external ends of the bars that is slightly larger than the dimension of the overlapped bars 15 of the sections 3, 3' at the connection. The bars 43 are provided with slots 49 therein so that each of the bars 43 comprises two leg parts 51 at the external end thereof. A separate insulating tube 53 is supported on and covers each of the bars 41 and parts of the associated bars 43. The three power take-off bus structures 39 are supported in the housing 37 by means of a pair of rigid insulating members 54 (only one of which is seen in FIG. 3) that are oppositely disposed and that are provided with suitable slots therein for receiving the take-off bus structures 39. The insulators 54 are suitably secured in the housing 7 to secure the power take-off bus structures 39 in the housing 37 in a generally parallel mutually flatwise spaced relationship.

Each of two opposite housing wall parts of the housing structure terminates short of the uninsulated end parts of the bus bars at each end of the section. Each of these wall parts terminates at 55 (FIG. 2) at one end and at 56 at the other end. Each of the other two opposite housing wall parts comprises an end part 57 at one end thereof and an end part 58 at the other end thereof. Each of the end parts 58 is provided with an opening for receiving the bolt and nut structure 25, 61, 63 as seen in FIG. 2. At the connection the end parts 57' of the similar section 3' underlap with the end parts 58 of the disclosed section 3 in the manner shown in FIG. 2. With the two opposite housing wall parts terminating at 55 and 56, it can be understood that housing structure of the connected sections is open, at each of two opposite sides thereof. When the power take-off device is connected to the duct, the power take-off bus structure 39 pass through the housing opening at one side of the housing and the opening is closed by the housing structure 37 of the take-off device. The housing structure 37 is suitably secured to the housing structure 11 by securing means such as screws 59. The other open side of the duct housing is closed at the connection by a cover plate 60 that is secured to the housing structure 11 by suitable securing means such as screws 61. If the sections 3, 3' are connected without a power take-off device 9, two cover plates 60 can be used to close off the two open sides of the duct housing at the connection.

The housing parts 58 are provided with openings therein for receiving the bolt 25. The bolt 25, extends through these openings so that the bolt-head 61 and a nut 63 are accessible for operation. Two spring washer members 65 are provided at the outer sides of the outer insulating members 33. The insulating members 31, 33; the bolt 25 and nut 63; the insulating tube 27 and the spring washers 65 are all supported on the connecting end part 7 of the bus duct section 3. The spring washers 65, the insulating members 31, 33 and the bus bars 15, at the connecting end part 7 of the section 3, are all provided with openings therein that are only slightly larger than the bolt 25 and tube 27 for receiving the bolt 25 and tube 27. The bolt 25 and nut 63 support the insulating spacing members 31, 33 and spring washers 65 on the bus bars at the connecting-end part 7 of the bus duct section 3. When it is desired to connect a similar section 3' to the bus duct section 3, the connecting-end part 5' of the similar section 3' is moved into an end-to-end relationship with the connecting-end part 7 of the bus duct section 3. During this connecting operation, the slotted ends of the bus bars of the bus duct section 3' receive the bolt 25 and tube 27, and the uninsulated end parts of the bus bars at the section 3' are positioned in overlapping relationships with the uninsulated end parts of the bus bars of the section 3. Thereafter, the power take-off device 9 is moved into the position seen in FIGS. 1-3, with the opposite bars 43 of each of the take-off bus structures 39 overlapping the two different overlapped bus bars 15, 15', and with the opposite legs 51 (FIG. 5) of each bar 43 moving into a pair of spaced parallel slots 67 (FIG. 4) that are provided in the insulating spacing members 31, 33. When the sections 3, 3' and the power take-off device 9 are in the position disclosed in FIGS. 1-3, the nut 63 and bolt 25 are tightened drawing the spring washers 65 toward each other to thereby draw the insulating spacing members 31, 33 and the conductors 43, 15, 15' toward each other into a compact sandwiched relationship to thereby provide a pressure connection between each set of conductors 15, 15', 43 at the connection. The cantilever supported bars 43 flex slightly to effect the pressure connection when the nut 63 and bolt 25 are tightened. The spring washers 65 provide contact pressure at the connection. During this connecting operation, the leg parts 51 of the power take-off bus structures 39 engage the flat surfaces 71 at the bottoms (FIG. 4) of the slots 67. It is noted that the thickness of each of the leg parts 51 is a dimension slightly greater than the depth of the associated slot 67 in order to enable the pressure connection to be made by compacting the insulating members 31, 33, and conductors 15, 15', 43 together in a sandwich-type arrangement. Each of the insulating members 31, 33 is provided with slanted surfaces 73 (FIG. 4), on the opposite faces thereof, that widen in the direction toward the center of the insulator to thereby provide cam or guide surfaces to guide the bus bars into the connected position. Each of the insulating members 31, 33 is provided with a flat surface part 75 at each of the two opposite faces thereof. The outer flat surface parts 75 of the two outer insulating members 33 are engaged by the spring washers 65. The inner flat surface parts 75 of the outer insulating members 33, and the two opposite flat surface parts of each of the inner insulating members 31, engage the bus bars 15, 15' when the sections 3, 3' are connected without a power take-off device in a manner to be hereinafter described.

When it is desired to remove theh power take-off device 9, the screws 59 (FIG. 3) are removed, and the nut 63 and bolt 25 are loosened to relieve the pressure connection whereupon the power take-off device 9 can be pulled out away from the connected sections 3, 3'. The opening in the housing part at the connection may be closed by a cover plate like the cover plate 60. With the power take-off device removed, the bolt 25 and nut 63 can be tightened drawing the insulating spacing members 31, 33 toward each other in which case the bus bars 15, 15' will engage flat surfaces 75 (FIG. 4) of the associated insulating spacing members 31, 33 to provide pressure between the insulating members 31, 33 and the bus bars 15, 15' to thereby connect the bus bars 15, 15' in an overlapping connected relationship. The spring washers 65 provide contact pressure at the connection. When it is desired to disconnect the sections 3, 3' of the bus duct, the bolt 25 and nut 63 are loosened, the cover plates 60 are removed and the section 3' is pulled away with the bolt 25 and tube 27 leaving the slots of the slotted ends of the connecting-end part 5' of the bus duct section 3'.

The insulating spacing members 31 and 33 are given different reference characters only because it is necessary that each of the inner insulating spacing members 31 be provided with means for receiving the conducting prongs 51 at each of the two opposite sides thereof whereas each of the outer insulating spacing members 33 need only be provided with means for receiving the conducting prongs 51 at the inner side thereof that faces the bus bars.

In the embodiment shown in the drawings, first surface means 71 (FIG. 4) of the insulating members 31, 33 engage the adjacent conductor 43 to provide the pressure type connection when the power take-off device 9 is connected to the bus duct sections 3, 3', and second surface means 75 (FIG. 4) engage the adjacent bus bars 15, 15' to provide the pressure type connection when the bus duct sections 3, 3' are connected together without a power take-off device.

Each of the take-off bus bar conductor structures 39 could be constructed with only one of the pair of bars 43. For example, each of the bus bar conductor structures 39 could be constructed with only the top bar of the pair of bars 43. In this case, when the power take-off device is in the connected position, the first surface means of the insulating spacing members 31, 33 would be the surface 71 (FIG. 4), of the insulating spacing members 31, 33, that would be adjacent the top bars 43, and the surface 75, of the insulating spacing members that would be adjacent the bus bars 15 (FIG. 3). The sections would be connected without the power take-off device in the same manner as was previously described in that the bus bars 15, 15' would be engaged by the second surface means 75 (FIG. 4) that would engage the adjacent bus bars 15 and 15' to provide the pressure-type connection.

From the foregoing it can be understood that there is provided by this invention improved bus duct comprising two similar sections removably connected in an end-to-end relationship by means of a single-bolt connecting structure, and a power take-off device that is removably connectable to the sections at the connection by means of the single-bolt connecting structure. The connection comprises a plurality of overlapped sets of bus bar conductors with each set comprising a bus bar conductor from each section and a power take-off bus structure of the power take-off device. Insulating spacing members are provided to insulate and space the sets of connected bus bar conductors from each other, and a single bolt is tightened to draw spring washers toward members and bus bar conductors in a compact relationship. Each of the power take-off structures comprises a pair of forked conductors that engage overlapped bus bars of the section at the opposite sides of the overlapped bus bars to provide adequate current transfer from the bus bar conductors of the sections to the take-off bus structure. The insulating spacing members are provided with first surface means for engaging the adjacent conductors to provide the pressure connection when the power take-off device is connected to the sections, and with second surface means for engaging the adjacent conductors to provide connection when the power take-off device is not utilized at the connection. With the single bolt connecting structure, the power take-off device and the bus duct sections are readily connectable and disconnectable at an installation.

Since numerous changes may be made in the above-described construction, and because different embodiments of the invention may be made without departing from the spirit and scope of the invention, it is intended that all matter contained in the foregoing description or shown in the accompanying drawings shall be interpreted as illustrative and not in a limiting sense.

I claim as my invention:

1. In combination; two elongated sections of bus duct and a power take-off device; conducting means comprising a plurality of generally flat bus bar conductors in each of said sections and a plurality of take-off bus bar conductor structures in said power take-off device; each of said sections comprising a plurality of said generally flat bus bar conductors and means supporting the bus bar conductors in a generally parallel face-to-face relationship; said power take-off device comprising a take-off bus bar conductor structure for each of the bus bar conductors in one of said sections; connecting means connecting said two sections and said power take-off device together at a connection in lapped sets with each lapped set comprising a different bus bar conductor of a first of said sections, a different bus bar conductor of the second of said sections and a different take-off bus bar conductor structure of said power take-off device; insulating spacing means at said connection; securing means in a tightened condition drawing said sets and said insulating spacing means together into a compact sandwiched relationship at said connection; said insulating spacing means spacing and insulating said sets from each other; said insulating spacing means comprising a separate insulating spacing member on each of two opposite sides of said plurality of bus bar conductors and take-off bus bar conductor structures and a separate insulating spacing member between each pair of adjacent sets; said insulating spacing members comprising first surface means engaging said conducting means in said connected position; said securing means being loosenable and said power take-off device being removable from said connection when said securing means is loosened; said securing means being tightenable when said power take-off device is removed whereupon said securing means draws said insulating spacing members and said bus bar conductors into a compact sandwiched relationship connecting said sections together with each of the bus bar conductors of said first section being in a lapped connected relationship with the associated different but bar conductor of the second of said sections; and said insulating spacing members comprising a second surface means engaging said bus bar conductors when said sections are connected together with said power take-off device removed.

2. The combination according to claim 1; and said securing means comprising a single bolt passing through opening means in said insulating spacing members, said bus bar conductors and said take-off bus bar conductor structures.

3. The combination according to claim 2; and each of said take-off bus bar conductor structures comprising a pair of spaced bus bars engaging the associated two connected lapped bus bar conductors on each of the two opposite sides of the two connected lapped bus bar conductors in the connected position thereof.

4. The combination according to claim 3; and each of said spaced bus bars of each of said take-off bus bar conductor structures comprising a conductor having a slot therein receiving said bolt means of said securing means in the connected position thereof.

5. The combination according to claim 4; and each of said insulating spacing members having slot means therein for receiving the bus bars of each adjacent take-off bus bar conductor structure with the base of each slot means being part of said first surface means.

6. In combination; two elongated sections of bus duct and a power take-off device; conducting means comprising a plurality of elongated bus bar conductors in each of said sections and a plurality of bus bar conductor structures in said power take-off device; each of said sections comprising an elongated housing and a plurality of said bus bar conductors supported in the housing in a spaced stacked relationship; said power take-off device comprising support means and said plurality of bus bar conductor structures supported on said support means in a spaced stacked relationship; connecting means connecting said two sections and said power take-off device together at a connection in lapped sets with each lapped set comprising a different bus bar conductor from each of said sections and a different bus bar conductor structure from said power take-off device and with said sections being connected in a generally end-to-end relationship; insulating spacing means at said connection spacing and insulating said sets from each other; said connecting means comprising securing means in a tightened condition drawing said sets and said insulating spacing means together in a stacked compact sandwiched relationship at said connection, said insulating spacing means having slot means therein open at at least one side of said sections; said bus bar conductor structures extending into said open slot means from said one side of said sections; said insulating spacing means comprising a first surface means in said slot means engaging said conducting means to effect said connection; said tightened securing means being loosenable and said power take-off device being removable from said connection with said bus bar conductor structures moving out through said open slot means at said one side of said section; said securing means being tightenable when said power take-off device is removed; and said insulating spacing means comprising a second surface means external of said slot means for engaging said bus bar conductors to effect a connection between said bus bar conductors when said securing means is tightened with said power take-off device removed which tightening will draw said insulating spacing members and said bus bar conductors together in a stacked compact sandwiched relationship.

7. In combination; two elongated sections of bus duct and a power take-off device; conducting means comprising a plurality of elongated bus bar conductors in each of said sections and a plurality of bus bar conductor structures in said power take-off device; each of said sections comprising an elongated housing and a plurality of said bus bar conductors supported in the housing in a spaced stacked relationship; said power take-off device comprising support means and said plurality of bus bar conductor structures supported on said support means in a spaced stacked relationship; connecting means connecting said two sections and said power take-off device together at a connection in lapped sets with each lapped set comprising a different bus bar conductor from each of said sections and a different bus bar conductor structure from said power take-off device and with said sections being connected in a generally end-to-end relationship; insulating spacing means at said connection spacing and insulating said sets from each other; said connecting means comprising securing means in a tightened condition drawing said sets and said insulating spacing means together in a stacked compact sandwiched relationship at said connection; said insulating spacing means comprising a separate insulating spacing member on each of two opposite sides of said plurality of bus bar conductors and bus bar conductor structures and a separate insulating spacing member between each pair of adjacent sets; each of said insulating spacing members, each of said bus bar conductors and each of said bus bar conductor structures having opening means therein; said securing means comprising a single bolt means extending through said opening means in said insulating spacing members, said bus bar conductors and said bus bar conductor structures; said insulating spacing members comprising a first surface means engaging said conducting means to effect said connection; said securing means being loosenable and said power take-off device being removable from said connection when said securing means is loosened; said securing means being tightenable when said power take-off device is removed; and said insulating spacing members comprising a second surface means for engaging said bus bar conductors to effect a connection between said bus bar conductors when said securing means is tightened with said power take-off device removed which tightening will draw said insulating spacing members and said bus bar conductors together in a stacked compact sandwiched relationship.

8. The combination according to claim 7; each of said bus bar conductor structures comprising a pair of spaced conductors lapping the associated two bus bar conductors on each of two opposite sides of the associated two bus bar conductors; each of said spaced conductors comprising a generally U-shaped conductor comprising two spaced legs; each of said insulating spacing members on the two opposite sides of said bus bar conductors and bus bar conductor structures comprising a pair of spaced slots at the inner side thereof for receiving the spaced legs of the associated spaced conductor; each of the insulating spacing members between each pair of adjacent sets comprising a pair of spaced slots at each of two opposite sides thereof for receiving the associated space legs of the associated space conductor; said first surface means of said insulating spacing members comprising the bottoms of said slots; each of said slots having a depth that is less than the thickness of the associated leg of the associated spaced conductor; and said second surface means of said insulating spacing members being surfaces of said insulating spacing members on the outside of said slots.

9. The combination according to claim 6; said insulating spacing members, said bus bar conductors and said bus bar conductor structures having aligned openings therein; and said connecting means comprising a single bolt means extending through said aligned openings.

References Cited

UNITED STATES PATENTS

| | | | |
|---|---|---|---|
| 3,004,097 | 10/1961 | Johnston et al | 174—88 |
| 3,183,298 | 5/1965 | Weimer et al. | 174—88 |

FOREIGN PATENTS

| | | |
|---|---|---|
| 123,336 | 6/1931 | Austria |

LARAMIE E. ASKIN, *Primary Examiner*